US005930102A

United States Patent [19]

Rook

[11] Patent Number: 5,930,102

[45] Date of Patent: Jul. 27, 1999

[54] SURGE ARRESTER HAVING SINGLE SURGE ARRESTING BLOCK

[75] Inventor: Larry E. Rook, Chicago, Ill.

[73] Assignee: Joslyn Manufacturing Co., Chicago, Ill.

[21] Appl. No.: 08/947,049

[22] Filed: Oct. 8, 1997

[51] Int. Cl.[6] .......... H02H 1/00

[52] U.S. Cl. .......... 361/127; 361/131

[58] Field of Search .......... 361/126, 127, 361/117–118, 131, 91, 111; 338/21, 22 R

[56] References Cited

U.S. PATENT DOCUMENTS

| | | | |
|---|---|---|---|
| 3,227,983 | 1/1966 | Braun | 338/21 |
| 4,729,053 | 3/1988 | Maier et al. | 361/118 |
| 4,825,188 | 4/1989 | Parraud et al. | 338/21 |
| 4,833,438 | 5/1989 | Parraud et al. | 338/21 |
| 5,237,482 | 8/1993 | Osterhout et al. | 361/117 |
| 5,602,710 | 2/1997 | Schmidt et al. | 361/127 |
| 5,652,690 | 7/1997 | Mansfield et al. | 361/127 |

FOREIGN PATENT DOCUMENTS

| | | | |
|---|---|---|---|
| 33 34 533 | 4/1985 | Germany . | |
| 07066012 | 3/1995 | Japan | H01C 7/12 |

OTHER PUBLICATIONS

International Search Report, dated Feb. 9, 1998, Application No. PCT/US98/11051.

*Primary Examiner*—Michael J. Sherry
*Attorney, Agent, or Firm*—Marshall, O'Toole, Gerstein, Murray & Borun

[57] ABSTRACT

A surge arrester includes an electrically insulating arrester housing and a surge arresting block housed within the electrically insulating arrester housing. The surge arresting block is arranged to provide support for the surge arrester without the use of a support member. The surge arresting block may be a single surge arresting block having a voltage rating of at least 9 KV. The surge arresting block may have threads formed integrally therewith.

42 Claims, 6 Drawing Sheets

SURGE ARRESTER HAVING SINGLE SURGE ARRESTING BLOCK

TECHNICAL FIELD OF THE INVENTION

The present invention relates to a surge arrester for shunting electrical surges to ground.

BACKGROUND OF THE INVENTION

Overvoltage surges, which travel along an electric power distribution system and which are not properly averted or diverted, often damage transformers and other electrical equipment of the electric power distribution system, as well as the electrical equipment of residential, commercial and industrial customers supplied by the electric power distribution system. Consequently, surge arresters are commonly used in an electric power distribution system for shunting overvoltage surges to system ground before the overvoltage surges can damage the electrical equipment connected in, or to, the electric power distribution system.

A typical surge arrester used in electric power distribution systems comprises an insulating housing, a stack of surge arresting blocks, end connectors which are in electrical contact with each end of the surge arresting blocks and which are arranged to electrically connect the surge arrester between first and second electrical lines, and a fault disconnector for disconnecting the surge arrester from the first and/or second electrical lines in the event of a fault in the surge arresting block. The number of surge arresting blocks in the stack of surge arresting blocks depends on the geometry of the surge arresting blocks and the voltage rating of the surge arrester. For example, a surge arrester rated at 9 KV usually has two or three surge arresting blocks.

The insulating housing of the typical non-porcelain surge arrester is not strong enough to support and contain the stack of surge arresting blocks. Therefore, a support member, such as a fiberglass wrap or a fiberglass sleeve, is provided around the stack of surge arresting blocks and the end connectors in order to contain and support the surge arresting blocks within the insulating housing. Additional elements, such as springs, wave washers, and/or the like, are provided in order to compress the surge arresting blocks.

Because of the use of a support member and multiple surge arresting blocks, a surge arrester as described above is expensive to produce. The present invention is directed to a surge arrester which eliminates the need for a support member and/or which,uses a reduced number of surge arresting blocks.

SUMMARY OF THE INVENTION

In accordance with one aspect of the present invention, a surge arrester comprises an electrically insulating arrester housing and a surge arresting block housed within the electrically insulating arrester housing. The surge arresting block is arranged to provide support for the surge arrester without the use of a support member.

In accordance with another aspect of the present invention, a surge arrester comprises a single surge arresting block housed within an electrically insulating arrester housing. The single surge arresting block is fabricated of a material, and the single surge arresting block has threads formed of the material.

In accordance with yet another aspect of the present invention, a surge arrester comprises a surge arresting block housed within an electrically insulating arrester housing. The surge arresting block is fabricated of a continuous material so that the surge arresting block is of unitary construction, and the surge arresting block has a voltage rating of at least 9 KV.

In accordance with still another aspect of the present invention, a method of forming a surge arresting block comprises the following steps: a) placing sufficient material in an isostatic press to form a surge arresting block having a voltage rating of at least 9 KV; and b) controlling the isostatic press with a pressure/time profile arranged to bond the material together in order to form the surge arresting block.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
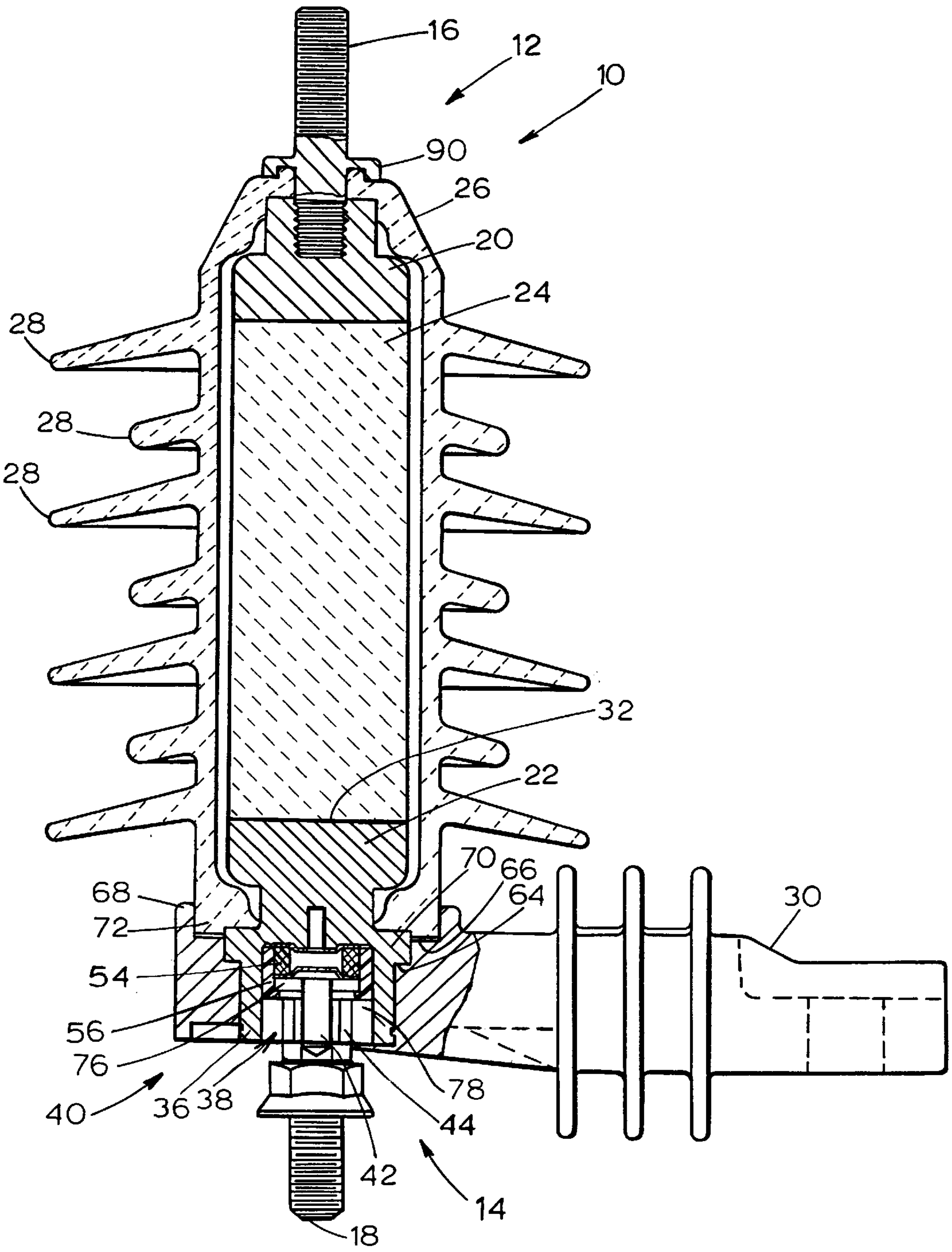
FIG. 1 illustrates a surge arrester which incorporates a surge arresting block and a pair of end connectors and which is arranged in accordance with the present invention.

As shown in FIG. 1, a surge arrester 10 includes a first terminal end 12 and a second terminal end 14. The first terminal end 12 includes a first terminal 16 which is used to electrically connect the surge arrester 10 to a first electrical line. The second terminal end 14 includes a second terminal 18 which is used to electrically connect the surge arrester 10 to a second electrical line. The first electrical line may be, for example, an electrically conducting lead which connects the first terminal 16 to a high voltage line of an electrical power distribution system, and the second electrical line may be an electrically conducting lead which connects the second terminal 18 to ground. Alternatively, however, the first electrical line may be, for example, an electrically conducting lead which connects the first terminal 16 to ground, and the second electrical line may be an electrically conducting lead which connects the second terminal 18 to a high voltage line of an electrical power distribution system.

The first terminal 16 is threaded into a first end connector 20, and the second terminal 18 is electrically connected into a second end connector 22 in a manner to be described below. The first and second end connectors 20 and 22 are electrically conductive and, for example, may be formed from aluminum. A surge arresting block 24 is in electrical contact with the first and second end connectors 20 and 22. Accordingly, a series circuit is formed between the first and second end connectors 20 and 22. The surge arresting block 24 may be a metal oxide varistor block, for example, which conducts in the presence of surges in order to shunt the surge energy in the electric power distribution system between the first and second terminals 16 and 18.

An arrester housing 26 houses the first and second end connectors 20 and 22 and the surge arresting block 24. As is known, the arrester housing 26 may be an insulating polymeric or porcelain housing having a plurality of polymeric or porcelain water sheds 28. A mounting bracket 30 is provided in order to mount and support the surge arrester 10 to a utility pole or other apparatus of an electric power distribution system.

Figure 2:
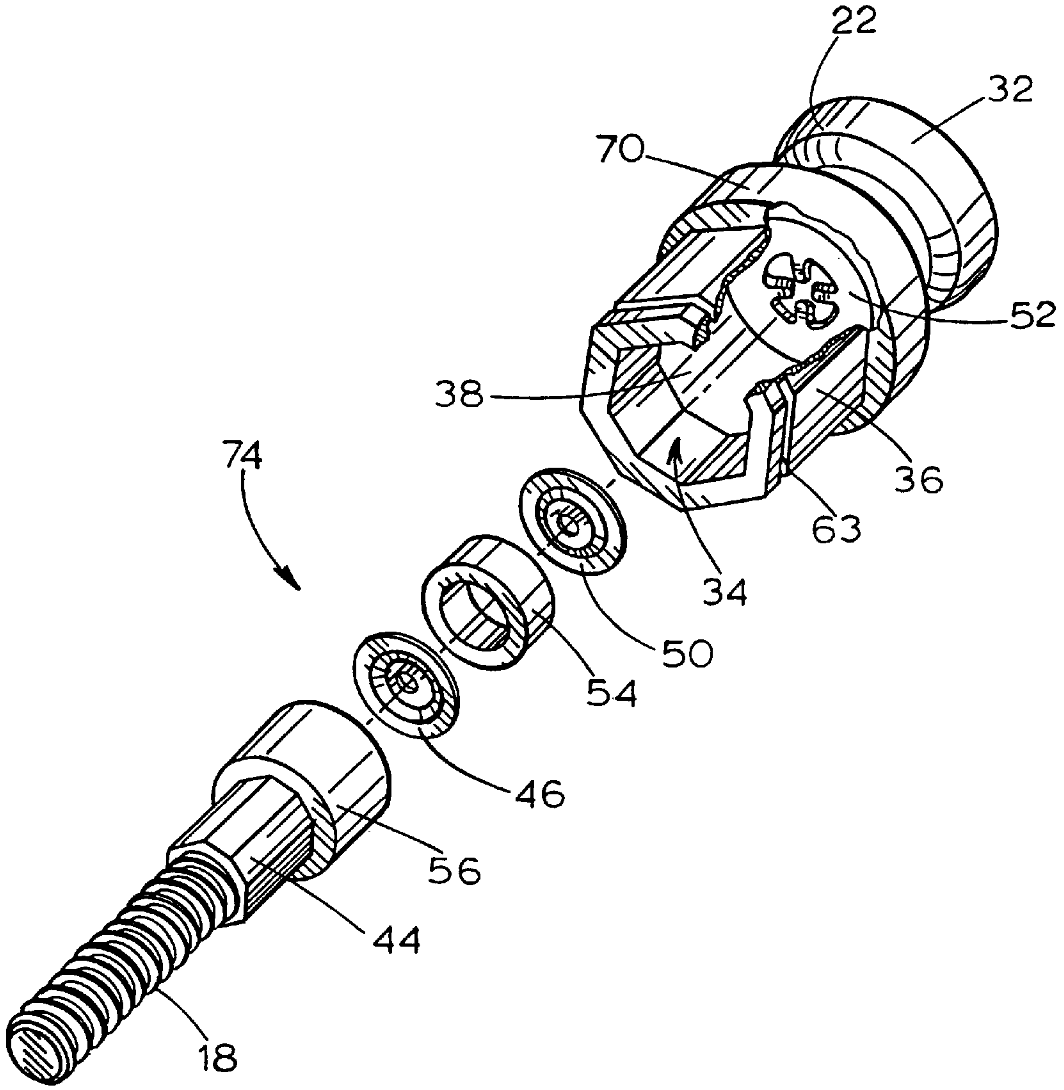
FIG. 2 illustrates a subassembly of the surge arrester shown in FIG. 1.

As shown in FIGS. 1 and 2, the second end connector 22 has a first end 32 which is in electrical contact with the surge arresting block 24. The second end connector 22 also has a second end 34 which comprises a wall 36 forming a recess 38. A fault disconnector 40 includes a cartridge 42 which is contained within an end 44 of the second terminal 18. The fault disconnector 40 includes a first electrically conductive washer 46 abutting the end 44 of the second terminal 18, a second electrically conductive washer 50 abutting an internal wall 52 of the second end connector 22, and a resistor 54 sandwiched between the first and second electrically conductive washers 46 and 50. A plastic cup 56 contains the first and second electrically conductive washers 46 and 50 and the resistor 54 when the fault disconnector 40 is assembled as shown in FIG. 1. Thus, the plastic cup 56 insulates the resistor 54 and the first and second electrically conductive washers 46 and 50 from the wall 36 of the second end connector 22 to thus direct fault current to flow from the second end connector 22 through the second electrically conductive washer 50, through the resistor 54, through the first electrically conductive washer 46, and through the second terminal 18.

Figure 3:
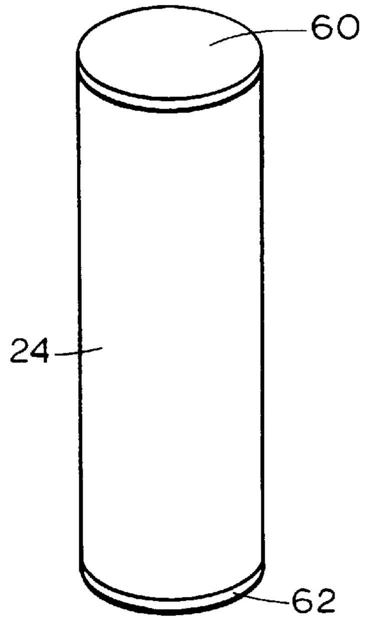
FIG. 3 illustrates the surge arresting block of FIG. 1.

The surge arresting block 24 is shown in FIG. 3. The surge arresting block 24 is provided with first and second metallized electrodes 60 and 62. The first metallized electrode 60 electrically contacts the first end connector 20, and the second metallized electrode 62 electrically contacts the second end connector 22. The first and second metallized electrodes 60 and 62 may be formed of any electrically conductive material such as copper, aluminum, zinc, silver, gold, or the like, or of any suitable electrically conductive composition such as compositions composed of silver, gold, platinum, palladium, and/or the like.

The first and second metallized electrodes 60 and 62 may be applied to the surge arresting block 24 dependent upon the electrode forming material. For example, if the first and second metallized electrodes 60 and 62 are formed of silver, the surge arresting block 24 is fired after it is formed, an electrically insulating collar is applied to the surge arresting block 24, the first and second metallized electrodes 60 and 62 are then applied to the surge arresting block 24, and then the surge arresting block 24 is again fired. The first and second metallized electrodes 60 and 62 may be applied by spraying or coating the ends of the surge arresting block 24 with silver. If threads are formed in the ends of the surge arresting block 24, as discussed below, the ends of the surge arresting block 24, including the threads, may be sprayed or coated with silver in order to form the first and second metallized electrodes 60 and 62.

On the other hand, if the first and second metallized electrodes 60 and 62 are formed of aluminum, the surge arresting block 24 is fired after it is formed, an electrically insulating collar is applied to the surge arresting block 24, the surge arresting block 24 is then again fired, and finally the first and second metallized electrodes 60 and 62 are applied to the surge arresting block 24. The first and second metallized electrodes 60 and 62 may be applied by arc spraying the ends of the surge arresting block 24 with aluminum. If threads are formed in the ends of the surge arresting block 24, the ends of the surge arresting block 24, including the threads, may be arc sprayed with aluminum in order to form the first and second metallized electrodes 60 and 62.

Figure 4:
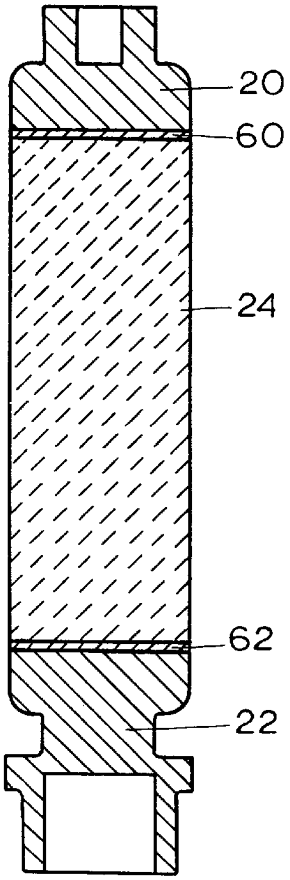
FIG. 4 illustrates the surge arresting block and end connectors of FIG. 1.

After the first and second metallized electrodes 60 and 62 are applied to the surge arresting block 24, the first and second end connectors 20 and 22 are suitably attached to the first and second metallized electrodes 60 and 62, respectively, as shown in FIG. 4. For example, the first and second end connectors 20 and 22 may be bonded to the first and second metallized electrodes 60 and 62, respectively, by a suitable bonding agent, such as an electrically conductive epoxy or solder.

Figure 5:
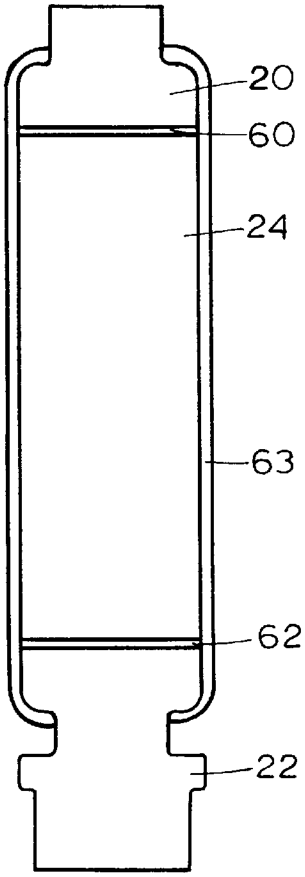
FIG. 5 illustrates the surge arresting block and end connectors of FIG. 1, wherein the end connectors are held to the surge arresting block by an electrically insulating member.

Alternatively, if the first and second end connectors 20 and 22 are not bonded to the first and second metallized electrodes 60 and 62, the first and second end connectors 20 and 22 may be retained on the surge arresting block 24 by encasing the surge arresting block 24 and the first and second end connectors 20 and 22 in an electrically insulating material 63 as shown in FIG. 5. The first and second end connectors 20 and 22 and the electrically insulating material 63 may be applied after the last firing step. The electrically insulating material 63, for example, may be fiberglass or other suitable material, such as epoxy, that can be applied as a wrap or sprayed around the first and second end connectors 20 and 22 and the surge arresting block 24. In this case, the electrically insulating material 63 acts as a support member.

As a further alternative, threads formed in the surge arresting block 24, as described below, may threadably engage corresponding threads of the first and second end connectors 20 and 22 in order to secure the surge arresting block 24 and the first and second end connectors 20 and 22 together.

As shown in FIGS. 1 and 2, the wall 36 of the second end connector 22 has a circumferential groove 63 therearound. During assembly of the surge arrester 10, the arrester housing 26 is applied to the subassembly comprising the surge arresting block 24, the first and second metallized electrodes 60 and 62, and the first and second end connectors 20 and 22 as shown in FIG. 1. For example, this subassembly may be inserted into the arrester housing 26. Alternatively, the arrester housing 26 may be molded directly onto this subassembly.

The arrester housing 26 is mounted to the mounting bracket 30 by inserting the wall 36 through a hole in the mounting bracket 30 as shown in FIG. 1. The mounting bracket 30 may have a first recess 64 and a second recess 66 which are concentric with respect to one another. The second recess 66 is defined by a generally cylindrical wall 68 of the mounting bracket 30. The generally cylindrical wall 68 may have an internal taper. As the second end connector 22 is pushed through the hole in the mounting bracket 30, a flange 70 of the second end connector 22 enters the first recess 64 of the mounting bracket 30, and the taper of the generally cylindrical wall 68 causes an end portion 72 of the arrester housing 26 to be squeezed between the generally cylindrical wall 68 and the flange 70 of the second end connector 22. As a result of this squeezing action, the end portion 72 acts as a gasket or seal at the second terminal end 14 in order to isolate the interior of the arrester housing 26 from the external environment. When the arrester housing 26 is fully pressed into the hole of the mounting bracket 30 so that the circumferential groove 63 is accessible, a snap ring (not shown) is snapped into the circumferential groove 63 in the wall 36 of the second end connector 22 to thereby clamp the surge arrester 10 to the mounting bracket 30 with enough force to maintain the seal formed by the end portion 72 between the generally cylindrical wall 68 and the flange 70 of the second end connector 22.

A subassembly 74 (FIG. 2) is formed by inserting the second terminal 18, with the cartridge 42 inserted in the end 44, through the plastic cup 56 until the plastic cup 56 abuts a flange 76 (FIG. 1) of the end 44 of the second terminal 18, and by inserting the first electrically conductive washer 46 into the plastic cup 56 until the first electrically conductive washer 46 abuts the flange 76 of the end 44 of the second terminal 18. The resistor 54 is inserted into the plastic cup 56 until the resistor 54 abuts the first electrically conductive washer 46, and the second electrically conductive washer 50 is placed on top of the resistor 54. The subassembly 74 is then inserted into the recess 38 of the second end connector 22 until the second electrically conductive washer 50 abuts the internal wall 52, leaving a space 78 as shown in FIG. 1. The space 78 is filled with an epoxy potting material in order to hold the subassembly 74 in electrical contact with the second end connector 22.

Instead of using a snap ring in the circumferential groove 63 of the second end connector 22 to clamp the first and second end connectors 20 and 22, the surge arresting block 24, and the arrester housing 26 to the mounting bracket 30, the second end connector 22 may be threaded into the mounting bracket 30.

As shown in FIG. 1, the arrester housing 26 is formed over the first end connector 20 so as to provide a seal in cooperation with a flange 90 of the first terminal 16. This seal at the first terminal end 12 isolates the interior of the arrester housing 26 from the external environment. Alternatively, the arrester housing 26 may be configured with an integral O-ring (not shown). The integral O-ring may be fitted into an annular groove (not shown) formed about the first end connector 20 in order to provide a seal at the first terminal end 12 that isolates the interior of the arrester housing 26 from the external environment.

Figure 6:
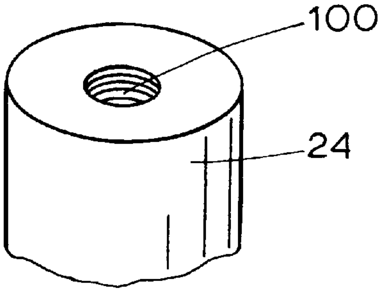
FIG. 6 illustrates the surge arresting block of FIG. 1 having female threads in accordance with one embodiment of the present invention.
Figure 7:
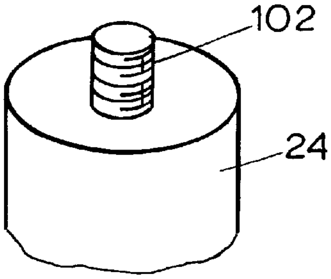
FIG. 7 illustrates the surge arresting block of FIG. 1 having male threads in accordance with another embodiment of the present invention.
Figure 8:
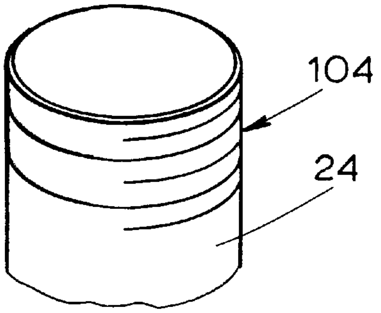
FIG. 8 illustrates the surge arresting block of FIG. 1 having male threads in accordance with still another embodiment of the present invention.

During formation of the surge arresting block 24, the surge arresting block 24 may be provided with female threads 100 in an end thereof as shown in FIG. 6. Indeed, the surge arresting block 24 may be provided with female threads 100 at each of its ends. Alternatively, the surge arresting block 24 may be provided with male threads 102 in an end thereof, as shown in FIG. 7, during formation of the surge arresting block 24. As in the case of the female threads 100, the surge arresting block 24 may be provided with male threads 102 at each of its ends. As a further alternative, the surge arresting block 24 may be provided with male threads 104 as shown in FIG. 8.

The female threads 100, the male threads 102, or the male threads 104 may be arranged to receive corresponding threads of the first and second end connectors 20 and 22. Accordingly, instead of bonding the first and second end connectors 20 and 22 to the surge arresting block 24, or instead of retaining the first and second end connectors 20 and 22 on the surge arresting block 24 with the electrically insulating material 63, as discussed above, the first and second end connectors 20 and 22 may be retained on the surge arresting block 24 by threaded engagement.

Figure 9:
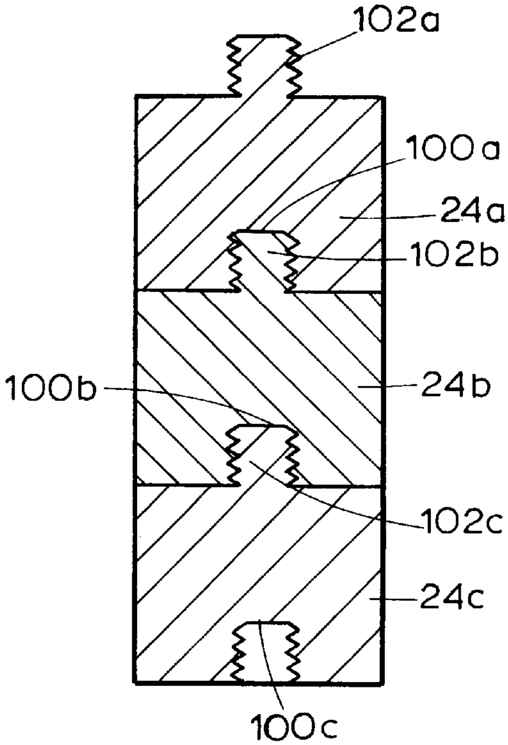
FIG. 9 illustrates a plurality of threadably engaged surge arresting blocks according to a first plural block embodiment of the present invention.

Additionally and/or alternatively, the surge arresting block 24 may be provided with male threads at one of its ends and female threads at the other of its ends so that several surge arresting blocks 24 may be threadably stacked as shown in FIG. 9. As shown in FIG. 9, male threads **102*b* of a surge arresting block 24*b* are threaded into female threads 100*a* of a surge arresting block 24*a*, and male threads 102*c* of a surge arresting block 24*c* are threaded into female threads 100*b* of the surge arresting block 24*b*. All surge arresting blocks 24 of this type may have the same voltage rating so that as many surge arresting blocks 24 as necessary are stacked as shown in FIG. 9 to meet a desired overall voltage rating. Alternatively, the surge arresting blocks 24 of this type may have a variety of voltage ratings so that the surge arresting blocks 24** may be mixed and matched to meet a desired overall voltage rating.

Figure 10:
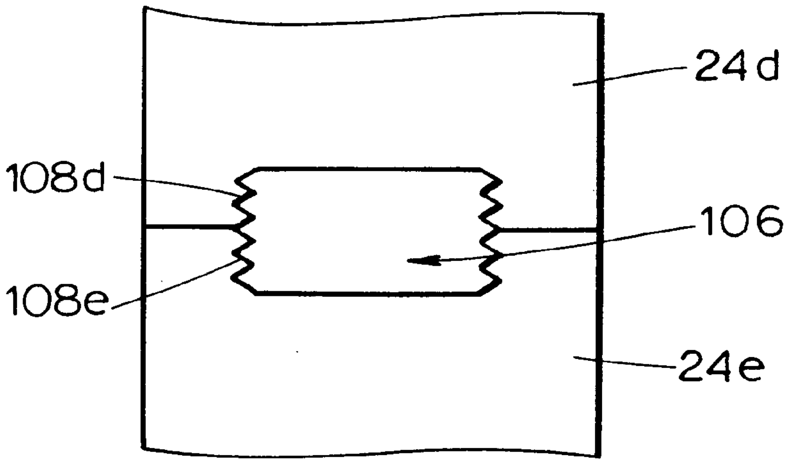
FIG. 10 illustrates a plurality of threadably engaged surge arresting blocks according to a second plural block embodiment of the present invention.

As a further additional and/or alternative embodiment of the present invention, the surge arresting block 24 may be provided with female threads at both of its ends so that several surge arresting blocks 24 may be threadably stacked as shown in FIG. 10. As shown in FIG. 10, a threaded conductive stud 106 (which may be formed from aluminum, for example) is threaded into female threads **108*d* of a surge arresting block 24*d* and into female threads 108*e* of a surge arresting block 24*e* so that the surge arresting blocks 24*d* and 24*e* electrically contact one another. All surge arresting blocks 24 of this type may have the same voltage rating so that as many surge arresting blocks 24 as necessary are stacked as shown in FIG. 10 to meet a desired overall voltage rating. Alternatively, the surge arresting blocks 24 of this type may have a variety of voltage ratings so that the surge arresting blocks 24** may be mixed and matched to meet a desired overall voltage rating.

Figure 11:
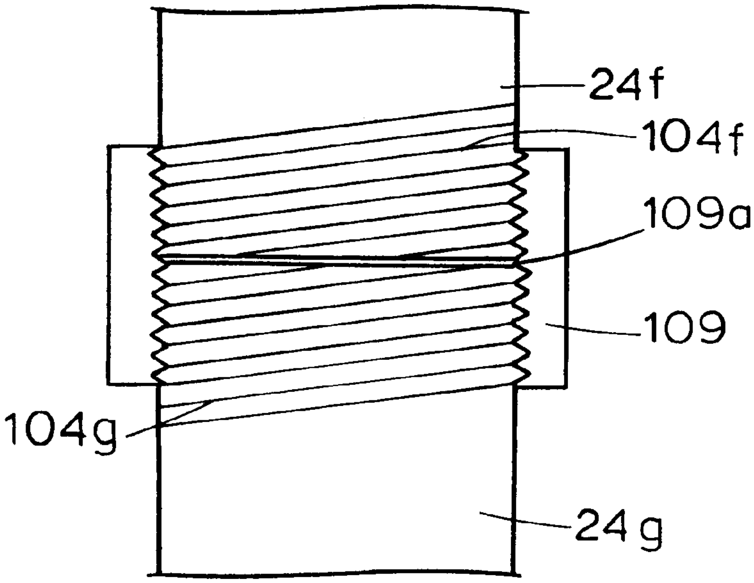
FIG. 11 illustrates a plurality of threadably engaged surge arresting blocks according to a third plural block embodiment of the present invention; and, FIG. 12 illustrates an isostatic press useful in forming the surge arresting block of the present invention.

As a still further additional and/or alternative embodiment of the present invention, the surge arresting block 24 of the type shown in FIG. 8 may be joined together as shown in FIG. 11. As shown in FIG. 11, a threaded sleeve 109 (which may be formed from a metal or insulating material, for example) is threaded onto male threads **104*f* of a surge arresting block 24*f* and onto male threads 104*g* of a surge arresting block 24*g* so that the surge arresting blocks 24*f* and 24*g* electrically contact one another. Element 109*a* represents metallized ends of the surge arresting blocks 24*f* and 24*g*. All surge arresting blocks 24 of this type may have the same voltage rating so that as many surge arresting blocks 24 as necessary are stacked as shown in FIG. 11 to meet a desired overall voltage rating. Alternatively, the surge arresting blocks 24 of this type may have a variety of voltage ratings so that the surge arresting blocks 24** may be mixed and matched to meet a desired overall voltage rating.

Figure 12:
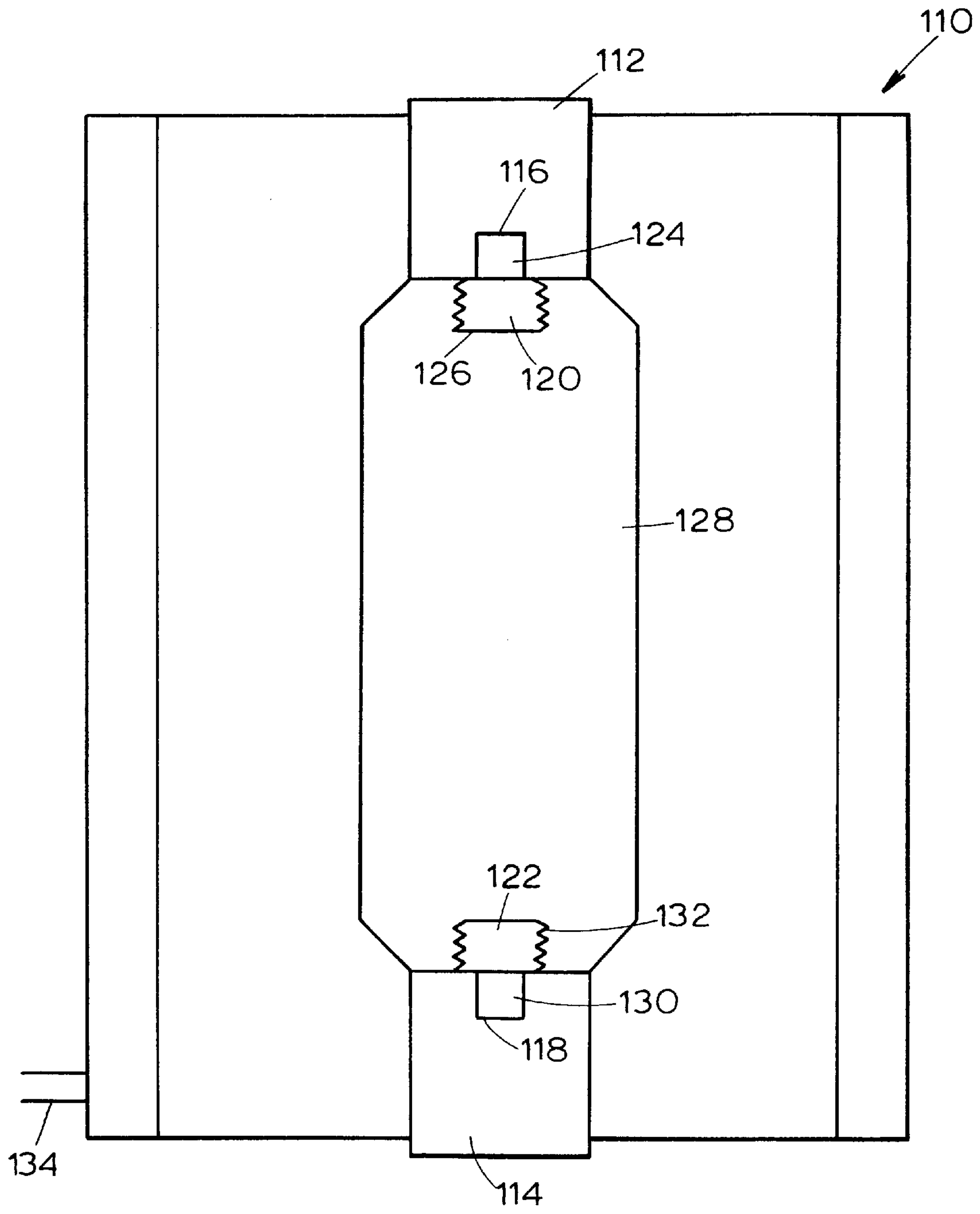

A surge arresting block having female threads 100 as shown in FIG. 6 may be formed using an isostatic press 110 as shown in FIG. 12. The isostatic press 110 is well known in the art. The isostatic press 110 has end plugs 112 and 114 which have corresponding recesses 116 and 118. The recesses 116 and 118 receive corresponding inserts 120 and 122. The insert 120 has a stem 124 that is inserted into the recess 116 of the end plug 112. The insert 120 also has a threaded end 126 that protrudes into a chamber 128 of the isostatic press 110 when the end plug 112 is applied as shown in FIG. 12. Similarly, the insert 122 has a stem 130 that is inserted into the recess 118 of the end plug 114. The insert 122 also has a threaded end 132 that protrudes into the chamber 128 of the isostatic press 110 when the end plug 114 is applied as shown in FIG. 12.

When the surge arresting block 24 is to be formed using the isostatic press 110, the end plug 114 is put into place, and the chamber 128 is filled with the material to be used in forming the surge arresting block 24. For example, if the surge arresting block 24 is to be a zinc oxide surge arresting block, the chamber 128 is filled with a mixture of a metal oxide powder and a bonding agent such as polyvinyl alcohol, where the bonding agent is about 1% by weight of the total mixture, although more bonding agent could be used. Then, the end plug 112 is put into place. Pressure greater than 5000 psi (such as 9200 psi) is applied to the isostatic press 110 through an inlet pipe 134 for a predetermined amount of time.

Thereafter, the isostatic press 110 is opened and the end plugs 112 and 114 are removed from the surge arresting block 24. To this end, the stems 124 and 130 of the inserts 120 and 122 may be provided with the type of ball latches that are used in socket wrenches in order to facilitate removal of the end plugs 112 and 114 from the inserts 120 and 122 which, to this point, are still attached to the surge arresting block 24. The inserts 120 and 122 are then threaded out of the surge arresting block 24 leaving the female threads 100 in each end of the surge arresting block 24.

The surge arresting block 24 may be provided with the male threads 102 in much the same way. However, instead of using the inserts 120 and 122, the recesses 116 and 118 are themselves threaded so that, when pressure is applied to the isostatic press, some of the material in the chamber 128 is forced into the threaded recesses 116 and 118. After this pressure has been applied for a predetermined amount of time, the isostatic press 110 is opened and the end plugs 112 and 114 are threaded off of the surge arresting block 24 leaving the male threads 102 at each end of the surge arresting block 24.

The surge arresting block 24 may be provided with the male threads 104 by suitably threading the bag defining the chamber 128 which, after pressure is applied to the isostatic press 110 through the inlet 134, would leave impressions in the surge arresting block 24 to form the male threads 104.

Certain modifications of the present invention have been discussed above. Other modifications will occur to those practicing in the art of the present invention. For example, the first terminal 16 and the first end connector 20 are shown as being separate elements. Instead, the first terminal 16 and the first end connector 20 may be formed as a single, integrated, electrically conductive element.

Also, as described above, the surge arrester 10 is assembled in the following order. First, the arrester housing 26 is applied to the stack of the surge arresting block 24 which is stacked between the first and second end connectors 20 and 22. Second, this arrangement is then secured to the mounting bracket 30. Third, the subassembly 74 is applied to the second end connector 22. Instead, the surge arrester 10 may be assembled in any desired order. For example, the arrester housing 26 may first be applied to the stack of the surge arresting block 24 and the first and second end connectors 20 and 22. Second, the subassembly 74 may be applied to the second end connector 22. Third, the resulting arrangement may be then secured to the mounting bracket 30.

Additionally, the plastic cup 56 may be formed of any type of electrically insulating material other than plastic.

Moreover, an electrically conductive spring, such as a spring washer, may be inserted between the second electrically conductive washer 50 and the internal wall 52.

Furthermore, as described above, the first and second metallized electrodes 60 and 62, if silver, are sprayed or coated on the surge arresting block 24 and, if aluminum, are arc sprayed on the surge arresting block 24. Instead, other application techniques may be used to apply the first and second metallized electrodes 60 and 62 to the surge arresting block 24.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A surge arrester comprising:

an electrically insulating arrester housing; and, a surge arresting block housed within the electrically insulating arrester housing, wherein the surge arresting block is fabricated of a surge responsive material, and wherein the surge arresting block has threads formed in the surge responsive material.

2. The surge arrester of claim 1 wherein the surge arresting block is the only surge arresting block housed within the electrically insulating arrester housing.

3. The surge arrester of claim 2 wherein the surge arresting block has a voltage rating of at least 9 KV.

4. The surge arrester of claim 1 further comprising an electrically insulating collar around the surge arresting block.

5. The surge arrester of claim 4 wherein the surge arresting block is the only surge arresting block housed within the electrically insulating arrester housing, and wherein the surge arresting block has a voltage rating of at least 9 KV.

6. The surge arrester of claim 1 further comprising connectors adapted to connect the surge arresting block between first and second electrical lines.

7. The surge arrester of claim 6 wherein the surge arresting block is the only surge arresting block housed within the electrically insulating arrester housing, and wherein the surge arresting block has a voltage rating of at least 9 KV.

8. The surge arrester of claim 6 wherein the connectors are bonded to the surge arresting block.

9. The surge arrester of claim 6 wherein the connectors threadably engage the threads of the surge arresting block.

10. The surge arrester of claim 9 wherein the threads of the surge arresting block are metallized.

11. The surge arrester of claim 1 wherein the surge arresting block is a first surge arresting block fabricated of the material, wherein the surge arrester further comprises a second surge arresting block fabricated of the material, wherein the first and second surge arresting blocks have threads formed in the material, and wherein the first and second surge arresting blocks threadably engage one another.

12. The surge arrester of claim 11 wherein the threads formed in the material are first threads of the first and second surge arresting blocks, wherein the first surge arresting block has second threads formed in the material, wherein the second surge arresting block has second threads formed in the material, wherein the second threads of the first surge arresting block threadably engage a first connector, wherein the second threads of the second surge arresting block threadably engage a second connector, wherein the first connector is adapted to connect the first surge arresting block to a first electrical line, and wherein the second connector is adapted to connect the second surge arresting block to a second electrical line.

13. The surge arrester of claim 1 further comprising:

a first connector in electrical contact with a first end of the surge arresting block;

a second connector in electrical contact with a second end of the surge arresting block; and a disconnector in electrical contact with the second connector and arranged to disconnect the surge arrester from an electrical line in the event of a fault in the surge arresting block.

14. The surge arrester of claim 1 wherein the surge arresting block has metallized first and second ends.

15. The surge arrester of claim 1 wherein the surge arresting block is a first surge arresting block fabricated of the material, wherein the surge arrester further comprises a second surge arresting block fabricated of the material, wherein the first and second surge arresting blocks have female threads formed in the material, and wherein a threaded stud threadably engages the female threads of the first and second surge arresting blocks.

16. The surge arrester of claim 1 wherein the surge arresting block is a first surge arresting block fabricated of the material, wherein the surge arrester further comprises a second surge arresting block fabricated of the material, wherein the first and second surge arresting blocks have male threads formed in the material around an outer perimeter of the first and second surge arresting blocks, and wherein a threaded sleeve threadably engages the male threads of the first and second surge arresting blocks.

17. The surge arrester of claim 1 wherein the material is a metal oxide.

18. A surge arrester comprising a single surge arresting block housed within an electrically insulating arrester housing, wherein the single surge arresting block is fabricated of a surge responsive material, and wherein the single surge arresting block has threads formed in the surge responsive material.

19. The surge arrester of claim 18 wherein the threads are male threads.

20. The surge arrester of claim 18 wherein the threads are female threads.

21. The surge arrester of claim 18 wherein the single surge arresting block has a voltage rating of at least 9 KV.

22. The surge arrester of claim 18 wherein the threads are metallized.

23. The surge arrester of claim 18 further comprising an electrically insulating collar around the single surge arresting block.

24. The surge arrester of claim 18 further comprising connectors adapted to connect the single surge arresting block between first and second electrical lines.

25. The surge arrester of claim 24 wherein the connectors threadably engage the threads of the single surge arresting block.

26. The surge arrester of claim 25 wherein the threads are metallized.

27. The surge arrester of claim 18 further comprising:

a first connector in electrical contact with a first end of the surge arresting block;

a second connector in electrical contact with a second end of the surge arresting block; and a disconnector in electrical contact with the second connector and arranged to disconnect the surge arrester from an electrical line in the event of a fault in the surge arresting block.

28. The surge arrester of claim 18 wherein the surge arresting block has metallized first and second ends.

29. The surge arrester of claim 18 wherein the material is a metal oxide.

30. A surge arrester comprising a surge arresting block housed within an electrically insulating arrester housing, wherein the surge arresting block is fabricated of a continuous surge responsive material so that the surge arresting block is of unitary construction, wherein the surge arresting block has threads formed in the material, and wherein the surge arresting block has a voltage rating of at least 9 KV.

31. The surge arrester of claim 30 wherein the threads are male threads.

32. The surge arrester of claim 30 wherein the threads are female threads.

33. The surge arrester of claim 30 further comprising an electrically insulating collar around the surge arresting block.

34. The surge arrester of claim 30 further comprising connectors adapted to connect the surge arresting block between first and second electrical lines.

35. The surge arrester of claim 34 wherein an electrically insulating collar is arranged to hold the connectors to the surge arresting block.

36. The surge arrester of claim 34 wherein the connectors are bonded to the surge arresting block.

37. The surge arrester of claim 34 wherein the connectors threadably engage the threads of the surge arresting block.

38. The surge arrester of claim 30 wherein the threads are metallized.

39. The surge arrester of claim 29 further comprising:

a first connector in electrical contact with a first end of the surge arresting block;

a second connector in electrical contact with a second end of the surge arresting block; and a disconnector in electrical contact with the second connector and arranged to disconnect the surge arrester from an electrical line in the event of a fault in the surge arresting block.

40. The surge arrester of claim 30 wherein the surge arresting block has metallized first and second ends.

41. The surge arrester of claim 30 wherein the surge arresting block is a first surge arresting block fabricated of the material, wherein the surge arrester further comprises a second surge arresting block fabricated of the material, wherein the first and second surge arresting blocks have female threads formed in the material, and wherein a threaded stud threadably engages the female threads of the first and second surge arresting blocks.

42. The surge arrester of claim 30 wherein the surge arresting block is a first surge arresting block fabricated of the material, wherein the surge arrester further comprises a second surge arresting block fabricated of the material, wherein the first and second surge arresting blocks have male threads formed in the material around an outer perimeter of the first and second surge arresting blocks, and wherein a threaded sleeve threadably engages the male threads of the first and second surge arresting blocks.

* * * * *